May 28, 1968     P. C. JACOBS, JR     3,385,939
ELECTRIC FUSE ADAPTED TO BE CONDUCTIVELY CONNECTED TO A CABLE
Filed Jan. 9, 1968
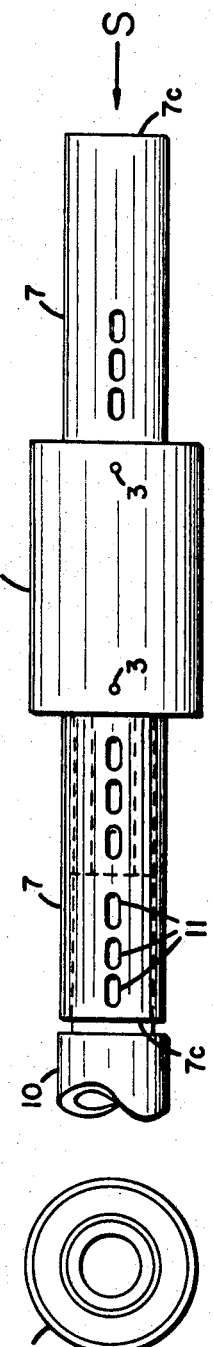
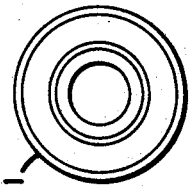
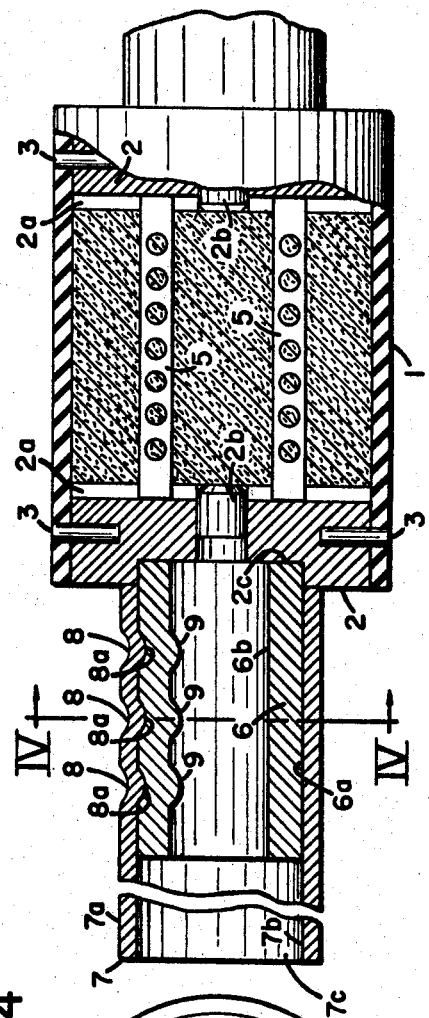
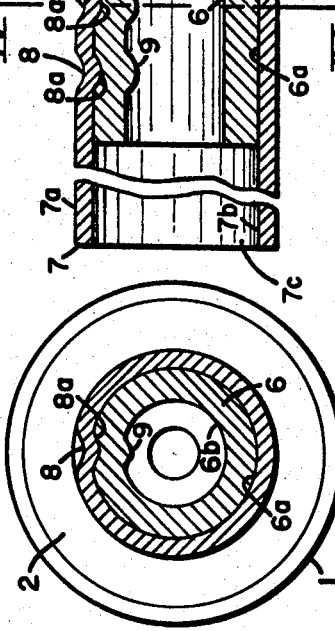
INVENTOR:
PHILIP C. JACOBS JR.
BY
ATTY.

United States Patent Office 3,385,939
Patented May 28, 1968

3,385,939
ELECTRIC FUSE ADAPTED TO BE CONDUC-
TIVELY CONNECTED TO A CABLE
Philip C. Jacobs, Jr., Newtonville, Mass., assignor to The
Chase-Shawmut Company, Newburyport, Mass.
Filed Jan. 9, 1968, Ser. No. 696,546
2 Claims. (Cl. 337—252)

ABSTRACT OF THE DISCLOSURE

An electric fuse adapted to be conductively connected to a cable, and more particularly to a cable made up of strands of aluminum. This is achieved by a tubular projection of copper integral with and coaxial to one of the terminal plugs of the fuse, and a tubular sleeve of aluminum mounted on said projection. The projection and the sleeve are joined together by local indents in the aluminum sleeve having such a depth as to form registering radially inwardly oriented mounds on the radially inner surface of the aforementioned projection.

Background of invention

The conventional connectors for connecting electric fuses intended for the protection of underground cables to such cables made up of copper strands are not suitable for connecting electric fuses to underground cables of aluminum. Serious difficulties are being encountered in connecting cable protective fuses to underground aluminum cables. These difficulties result from a combination of adverse factors including the fact that the connection must be established between dissimilar metals and capable of withstanding high operating temperatures, i.e., operating temperatures higher than those encountered in overhead systems, without changing its initially low voltage drop, i.e., without aging, or gradually deteriorating as time goes on, and that the connection must be capable of withstanding high tensile stresses, e.g., in the order of 2000 to 3000 lbs.

Electric fuses adapted to be connected to cables for protection of the latter are disclosed and claimed in U.S. Patent 2,770,757 to W. S. Edsall et al., Nov. 13, 1956, for Arrangements for the Protection of Cables Against Short-circuits Currents and Against Overloading and U.S. Patent 2,809,254 to W. S. Edsall, Oct. 8, 1957, for Composite Fusible Protective Device, but these prior art structures are not suited to be connected to cables of aluminum.

The problem of providing electric fuses which lend themselves to be connected to aluminum cables of A-C underground networks boils down to appropriately securing a length of aluminum tubing to a plug contact of a fuse. Such contacts are generally made of brass, or copper. Extensive cycling tests made with various designs involving solder or brazing joints showed deterioration thereof as time was progressing. The use of prior art compression connectors for solving the above problem did not result in structures having a tensile strength of the above order, i.e., the required tensile strength.

The present invention is a fully satisfactory solution to the problem which has been outlined above, and it is predicated on indents established with a conventional hydraulic indentation press.

Summary of invention

An electric fuse embodying this invention includes a tubular casing of electric insulating material and a pair of terminal plugs inserted into the ends of the casing. The casing is filled with a pulverulent arc-quenching filler, and fuse link means inside the casing submersed in said filler conductively interconnect said pair of terminal plugs. A tubular extension of copper is arranged in coaxial relation to said casing and to said pair of plugs extending axially outwardly from at least one of said pair of plugs. Said projection has a generally cylindrical outer surface and a generally cylindrical inner surface. The structure according to this invention further includes a tubular sleeve of aluminum coaxial with and mounted on said projection, and extending axially outwardly beyond said projection, and having an outer surface and a generally cylindrical inner surface in engagement with said outer surface of said projection. There are local indents in said outer surface of said sleeve, and juxtaposed radially inwardly oriented mounds on said inner surface of said sleeve indenting said outer surface of said projection, and said mounds on said inner surface of said sleeve are so high as to form inwardly oriented mounds on said inner surface of said projection.

Brief description of drawings

FIG. 1 is a side elevation of a structure embodying this invention including means for interposing the same between two serially connected lengths of cable;

FIG. 2 is an end view of the structure of FIG. 1 seen in the direction of the arrow S of FIG. 1;

FIG. 3 is substantially a longitudinal section of the structure of FIG. 1 drawn on a larger scale than FIG. 1, some of the portions of the structure of FIG. 1 being broken away; and FIG. 4 is a section along IV—IV of FIG. 3.

Description of preferred embodiment

Referring now to the drawings, and particularly FIGS. 3 and 4 thereof, numeral 1 has been applied to indicate a tubular casing of electric insulating material closed on both ends by terminal plugs 2 inserted and press-fitted into it. Transverse steel pins 3 project through casing 1 into plugs 2 firmly holding the latter in position. Casing 1 is filled with a pulverulent arc-quenching filler 4 as, for instance, quartz sand. The axially inner end surfaces of plugs 2 are provided with grooves 2a, receiving the axially outer ends of multiperforated fuse links, or fuse link means 5. The aforementioned ends of fuse link means 5 may be soldered into grooves 5 by a solder capable of establishing solder joints that withstand without deterioration the high temperatures occurring at these points. (These solder joints have not been shown in the drawing). Fuse link means 5 are entirely submerged in filler 4 and interconnect conductively terminal plugs 2. The right terminal plug 2 (as seen in FIG. 1) is provided with a central bore intended to fill filler 4 into casing 1. When this has been achieved that bore is closed by insertion of a plug member 2b into it. The axially outer surface of one or of both plug members is provided with a recess 2c having a circular bottom surface and a cylindrical lateral surface. Tubular projection 6 of copper is arranged in coaxial relation to casing 1 and plugs 2 and inserted into recess 2c and brazed to the plug 2 defining recess 2c.

In FIG. 3 only right plug 2 is shown to be provided with a tubular axial projection 6 and parts operatively related to it for connecting a cable to one end of the fuse structure. If desired, both terminal plugs 2 may be provided with a tubular axial extension 6 of the kind shown to the left of FIG. 3, thus adapting the fuse structure for insertion between two lengths of cable. This has been shown in FIG. 1. In some instances only one of the terminal plugs 2 needs adaptation for connection to an aluminum cable. The other terminal plug 2 may be intended to be conductively connected to a conductor other than a cable, e.g., to a bus bar. The terminal plug 2 not intended to be directly connected to a cable must be provided with connector means appropriate to the kind of conductor to which it is intended to be electrically connected.

Since tubular projection 6 is brazed to the terminal plug 2 immediately adjacent thereto parts 2 and 6 form an integral structure. Projection 6 is generally annular in cross-section, having a generally cylindrical outer surface 6a and a generally cylindrical radially inner surface 6b.

Tubular sleeve 7 of aluminum is arranged in coaxial relation to and mounted on projection 6 and extends axially outwardly beyond projection 5. Sleeve 7 has a radially outer surface 7a and a generally cylindrical radially inner surface 7b in engagement with said radially outer surface 6a of projection 6.

Reference character 8 has been applied to indicate three local indents in the outer surface of sleeve 7 arranged along a generatrix of sleeve 7. There is a radially inwardly oriented mound 8a on the inner surface of sleeve 7 juxtaposed to each indent 8. Each mound 8a formed by sleeve 7 indents the outer surface of tubular extension 6. Mounds 8a are so high to form juxtaposed radially inwardly oriented mounds 9 on the inner surface of projection 6. Thus parts 6 and 7 are firmly interlocked mechanically, and establish a current path that does not change as time goes on and which successfully withstands the most severe cycling tests.

If the inner diameter of part 6 were zero, i.e. if a solid rod were substituted for tubular projection 6 of copper, the above described mechanical interlock between parts 6 and 7 could not be achieved, and the structure would not perform as required. If the wall of tubular extension 6 were to thick for the purpose in hand, mounds 8 could not penetrate sufficiently deep into part 6 to form radially inwardly oriented mounds 9 on the inner surface thereof. In other words, if the thickness of the wall of tubular extension 6 were excessive for the purpose in hand, tubular extension 6 would behave substantially as a solid rod extension, precluding a satisfactory interlock between parts 6 and 7 or, in other words, precluding the formation of mounds 9 on surface 6b. The formation of mounds 9 is a measure that mounds 8a have sufficiently indented projection 6 to form a satisfactory interlock between parts 6 and 7.

Aluminum sleeve 7 has an open end 7c intended for the insertion of a cable into it.

As shown in FIG. 1 an aluminum cable 10 has been inserted into the open end 7c of sleeve 7, and firmly secured therein by three indents 11. A cable made up of strands of wire can readily be secured to an outer metal sleeve since portions of the outer sleeve readily interlock with the recesses between the constituent aluminum strand of the cable.

As shown in FIG. 3 tubular sleeve 7 has an axially inner end arranged immediately adjacent to the outer end surface of left terminal plug 2. This makes it possible to arrange the first indent, i.e. the indent immediately adjacent to plug 3, close to plug 3, thus minimizing the total length that must be given to sleeve 7 to establish a conductive mechanically strong connection between the fuse structure and a cable.

As is well known in the art, a surface conditioner or joint compound must be interposed between a copper surface and an aluminum surface wherever a compression connection is to be established between the two surfaces. One such surface conditioner or joint compound is known by the trade name "Penetrox A." It appears from the foregoing that the interface between extension 6 and sleeve 9 must be treated with a surface conditioner or joint compound such as, for instance, "Penetrox A" before sleeve 7 is mounted on extension 6 and indents 8 or formed.

After the fuse structure and the cable 10 have been connected mechanically and electrically by indents 11, the metal parts of the joint must be carefully electrically insulated. This can be achieved in a number of ways well known in the art. Some are disclosed in detail in the aforementioned U.S. Patents 2,770,757 and 2,809,254.

It will be understood that I have illustrated and described a preferred embodiment of my invention, and that various alterations may be made in the details thereof without departing from the invention as defined in the appended claims.

I claim as my invention:

1. An electric fuse to be conductively connected to a cable including in combination:
   (a) a tubular casing of electric insulating material;
   (b) a pair of terminal plugs inserted into the ends of said casing;
   (c) a pulverulent arc-welding filler inside said casing;
   (d) fuse link means inside said casing submersed in said filler conductively interconnecting said pair of terminal plugs;
   (e) a tubular projection of copper arranged in coaxial relation to said casing and to said pair of plugs extending axially outwardly from at least one of said pair of plugs, conductively connected to and forming an integral part of said one of said pair of plugs, said projection having a generally cylindrical radially outer surface and a generally cylindrical radially inner surface;
   (f) a tubular sleeve of aluminum coaxial with and mounted on said projection and extending axially outwardly beyond said projection and having a radially outer surface and a generally cylindrical radially inner surface in engagement with said outer surface of said projection; and
   (g) local indents in said outer surface of said sleeve and juxtaposed radially inwardly oriented mounds on said inner surface of said sleeve indenting said outer surface of said projection, and said mounds on said inner surface of said sleeve being so high as to form juxtaposed radially inwardly oriented mounds on said inner surface of said projection.

2. An electric fuse as specified in claim 1 wherein said one of said pair of terminal plugs is provided on the axially outer end surface thereof with a circular recess, wherein the axially inner end of said projection of copper projects into this recess and is brazed to said one of said pair of terminal plugs, and wherein said tubular sleeve of aluminum has an axially inner end arranged immediately adjacent the outer end surface of said one of said pair of terminal plugs.

References Cited

UNITED STATES PATENTS

| 2,809,254 | 10/1957 | Edsall | 200—114 |
| 3,065,292 | 11/1962 | Chickvary | 174—84 |
| 3,019,284 | 1/1962 | Matthysse | 174—84 |

BERNARD A. GILHEANY, *Primary Examiner.*

H. B. GILSON, *Assistant Examiner.*

UNITED STATES PATENT OFFICE
CERTIFICATE OF CORRECTION

Patent No. 3,385,939                                                May 28, 1968

Philip C. Jacobs, Jr.

It is certified that error appears in the above identified patent and that said Letters Patent are hereby corrected as shown below:

Column 2, lines 38, 49 and 51, cancel "4", each occurrence; line 60, "right" should read -- left --. Column 3, line 33, "to" should read -- too --. Column 4, line 6, "or" should read -- are --; line 24, "arc-welding" should read -- arc-quenching --; line 47, "inwradly" should read -- inwardly --.

Signed and sealed this 16th day of December 1969.

(SEAL)
Attest:

Edward M. Fletcher, Jr.                           WILLIAM E. SCHUYLER, JR.
Attesting Officer                                          Commissioner of Patents